Oct. 11, 1932.   C. O. GALBRAITH   1,882,554
RECORDING AND REPRODUCING SOUND
Filed Feb. 24, 1930   2 Sheets-Sheet 1
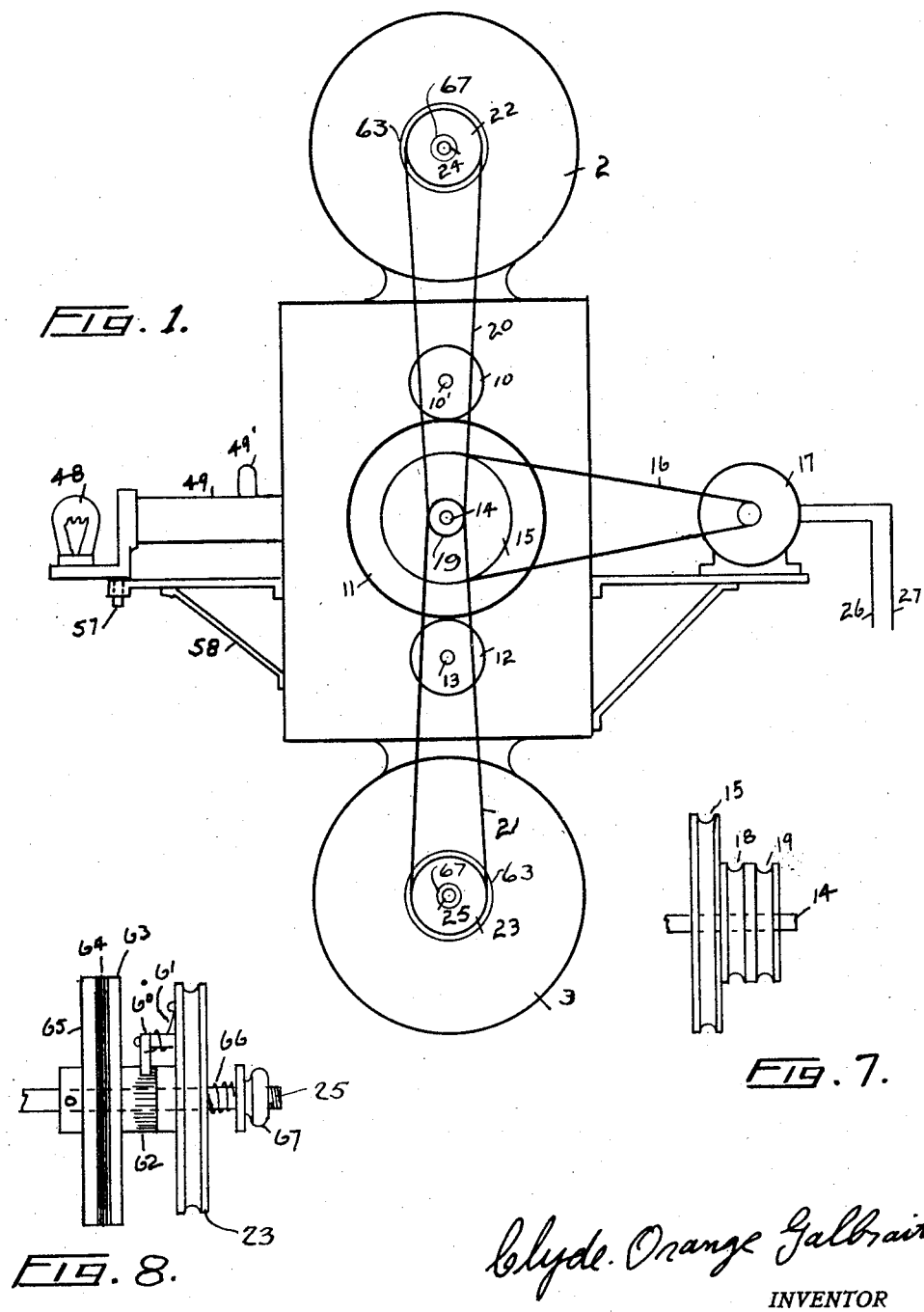

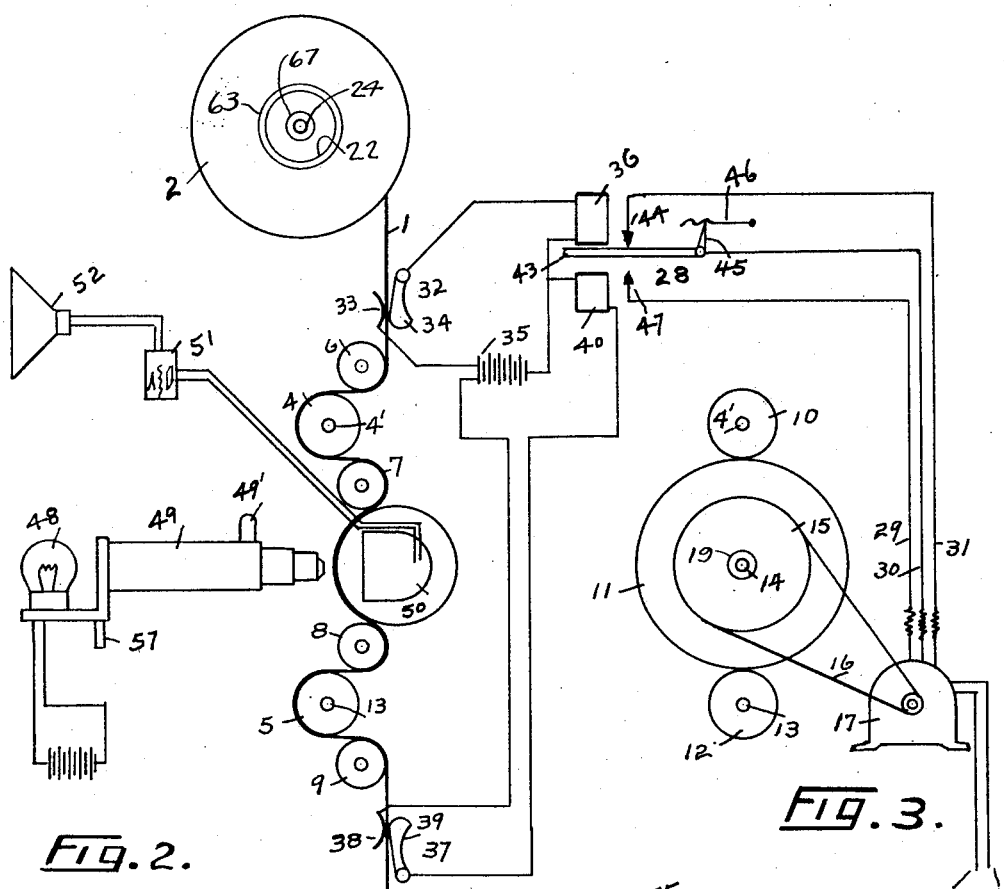
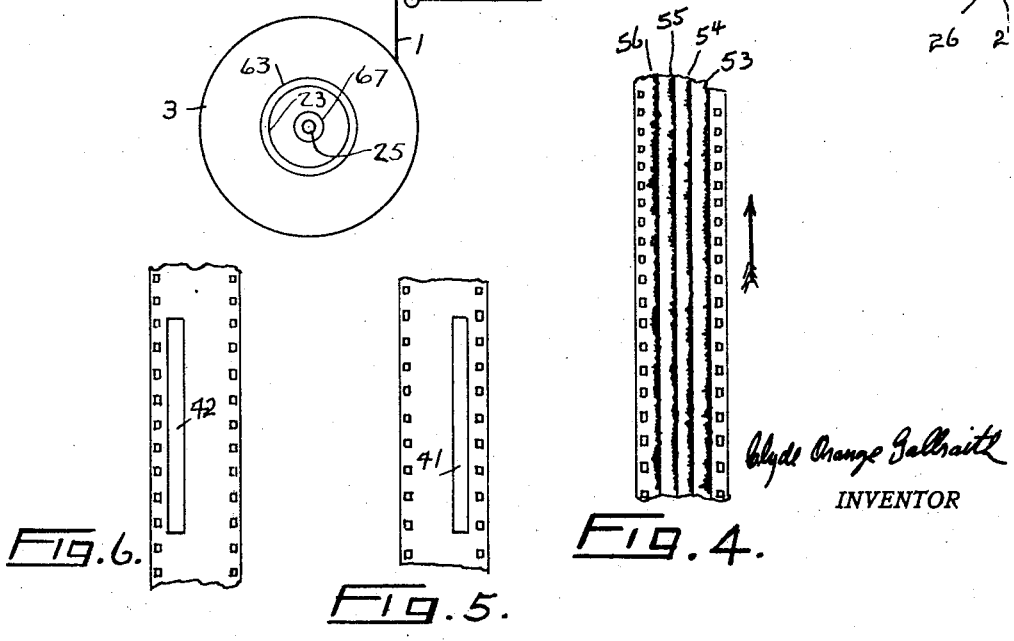

Patented Oct. 11, 1932

1,882,554

UNITED STATES PATENT OFFICE

CLYDE ORANGE GALBRAITH, OF LOS ANGELES, CALIFORNIA

RECORDING AND REPRODUCING SOUND

Application filed February 24, 1930. Serial No. 430,795.

In the common practice of recording a song or a piece of music on a film in the form of a photographic record, the length of the film on which the record is made is usually limited to approximately 1000 or 1100 ft. When the recorded song or piece of music is reproduced from such a film the time required is approximately 12 minutes, depending on the length of the piece recorded. To repeat such a piece of music or song it is necessary, if there is but one piece recorded on the film, to rewind the film. To reproduce a new piece it is necessary to change the film.

It is an object of my invention to provide a plurality of records on one film, thus economizing in the amount of film required to record several pieces of music or several songs, or a long speech.

It is a further object of my invention to arrange the several records in parallel on the film and in alternate reverse order. By this arrangement, when a song or piece of music has been reproduced and the film has been run to the end of the record the operating mechanism may be reversed and the film run in the reverse direction in continuation or another selection.

It is also an object of my invention to provide mechanism and means by which the film may be run in either direction, and to provide means by which a part of the mechanism may be actuated and moved so that any one of the several records may be reproduced selectively.

Other objects and advantages will be made apparent in the following specification and description and by aid of the accompanying drawings in which:—

Fig. 1 is an elevation of the apparatus showing diagrammatically the arrangement of the driving mechanism.

Fig. 2 is a diagrammatic representation of the general assembly of the apparatus in which various parts are shown in relation to other parts, Fig. 3 is a diagrammatic drawing of the gear wheels and driving motor removed from the other parts to make more clear the means by which the film moving sprockets are actuated and reversed in direction of movement, Fig. 4 represents a section of film on which the records are shown and indicated.

Fig. 5 represents a section of a film near one end showing an aperture disposed at one side of the center line of the film, Fig. 6 represents a section of a film near the opposite end with a like aperture disposed on the opposite side of the center line from that shown in Fig. 4.

Fig. 7 is a more detailed broken view of the pulley 15 and the pulleys 18 and 19, and Fig. 8 is a more detailed view of the pulley 22 or 23 together with a ratchet and a frictional drive for the film reels.

Considering the drawings with more particularlity, the film 1 is alternately wound in the film magazines 2 and 3 and is moved by the sprocket wheels 4 and 5 and passes over the rollers 6, 7, 8 and 9, that it may be kept in alignment and taut in a manner well known in this art. On the sprocket shaft 4' is a suitable gear wheel 10 shown in Fig. 3 as removed from its normal position on the shaft but in its proper relation to the intermediate gear wheel 11 and the gear wheel 12, the gear wheel 12 being normally mounted on the sprocket shaft 13. The intermediate gear wheel 11 operates in mesh with both the gear wheel 10 and the gear wheel 12.

The intermediate gear wheel 11 is mounted on the shaft 14 and secured thereto. Also secured upon the same shaft is the belt pulley 15 which is driven by a belt 16 from the motor 17. The belt pulleys 18 and 19 are also mounted on the shaft 14 and secured thereto. Belts 20 and 21 from these pulleys drive the pulleys 22 and 23 (which correspond to the pulley indicated for greater clearness of description as 59 in Fig. 8) which are mounted on the shafts 24 and 25 and drive the winding reels for the film which are mounted in the film magazines 2 and 3 in a manner well known in this art.

The motor 17 is energized by electric current supplied from a suitable source by the wires 26 and 27 and the motor is controlled by the switch 28 through the wires 29, 30 and 31.

Between the magazine 2 and the film roller 6 is located a switch 32 so positioned and disposed relative to the film 1 that the film 1 normally passes between the shoe 33 and the movable arm 34 of the switch 32 and normally keeps these two members separated and insulated from each other. An electric circuit includes the members 33 and 34, a source of energy 35 and an electro-magnet 36.

Likewise the switch 37 is positioned and disposed in a like position relative to the film and between the magazine 3 and the roller 9 and has a shoe 38 and a movable arm 39 which are included in an electric circuit which also includes the source of energy 35 and the electro-magnet 40.

In Fig. 5 a section of film is shown having an aperture 41 disposed at one side of the center line of the film and in Fig. 6 a section of film is shown having an aperture 42 disposed on the opposite side of the center line of the film. These figures represent the two opposite ends of a film and the apertures are positioned some distance from the end of the film and some distance from the end of the sound record on the film.

In operation the film 1 is moved from one magazine to the other by the action of the sprocket wheels 4 and 5 and passes over the rollers 6, 7, 8 and 9. As the film is moved down and the end of the film approaches the switch 32 the aperture in that end will pass through the switch 32 the arm 34 will enter the aperture and make contact with the plate 33 thus closing the electric circuit through the source of energy 35 and the magnet 36. The magnet 36 will become energized and the arm 43 will be drawn up into contact with the terminal 44 of the switch 28 thus closing an electric circuit including the wires 30 and 31 and the motor 17 to cause the motor circuit to be closed to operate the motor in a direction suitable to reverse the mechanism and cause the film to be moved in the direction opposite to that in which it was moving when the contact was made between the plate 33 and the arm 34.

When the arm 43 is moved by the magnet 36 into contact with the terminal 44 it is important that it be held in contact long enough for the film to be drawn through to near its full length. To accomplish this the arm 43 has a projection 45 which engages a notched spring 46 and is held in position in one of the notches.

When the film is run to near its end the arm 39 of the switch 37 will enter the aperture 42 which is positioned near the end of the film opposite to that in which the aperture 41 is positioned, and contact will be made with the plate 38 whereby an electric circuit is closed including the source of energy 35 and the magnet 40. The magnet 40 will be energized and pull the arm 43 of the switch 28 over into contact with the terminal 47 thus closing an electric circuit including the wires 29 and 30 and the motor 17 to cause the motor circuit to be closed to operate the motor in a direction suitable to reverse the mechanism and cause the film to be moved again in the opposite direction.

In Figs. 1 and 2 a light 48 and lens assembly 49 is shown as a means for bringing a reduced light beam to bear upon the film 1 in a suitable manner. Such light as passes through the film falls upon the photo-electric cell 50 which is connected in the usual manner with amplifying means 51 and a loud speaker 52.

In Fig. 4 is shown a section of film with a plurality of photographic sound records 53, 54, 55 and 56 thereon. These sound records are alternately in reverse direction, e. g. if the record 53 is arranged to be reproduced when the film is moving in the direction indicated by the arrow, the record 54 is arranged to be reproduced while the film is moving in the opposite direction, etc.

The lamp 48 and lens assembly 49 are arranged and mounted on a stud 57 disposed in a bracket 58 and the lens assembly is provided with a handle 49, or other suitable means by which the assembly may be moved laterally as respects the film 1. When the mechanism operating the film is reversed and the film is caused to move in a reverse direction the lens and lamp assembly is moved laterally so as to bring the reduced beam of light to be intercepted by a sound record suitably preposed to allow the recorded sound to be reproduced when the film is moving in that direction. Thus a long sound record or a series of shorter records may be reproduced from a film by means of the plurality of record tracks.

When the film is moving in the direction of the magazine 3 and is being wound on the reel contained therein in the usual manner it is important that the reel in magazine 3 be turned in such a manner as to wind up the film in a suitable manner and condition. To accomplish this and compensate for any irregularities two pulleys 18 and 19 are mounted on the shaft 14 to move with the pulley 15. On the reel shaft of each magazine is freely mounted a driven pulley 59 having a pawl 60 mounted thereon and held by the spring 61 in engagement with the ratchet wheel 62 whereby the disc 63 is rotatably driven when the pulley 59 is moving in one direction but is not driven when the pulley 59 is rotating in the reverse direction. On the face of the disc 63 is a friction material 64 which bears against a disc 65 and is held in frictional contact therewith by means of a spring 66 and adjusting nut 67 by means of which the pulley 59 is forced against the hub of the disc 63.

By means of this arrangement the reel is made to rotate by means of the belt, but if the belt should drive the reel too fast the friction discs will slip and compensate for the discrepancy in speed between the reel and film. Also while the film is being wound on one reel the other reel will be free to move to unwind the film by means of the ratchet.

The photographic sound record is prepared in the manner well known in the art except that instead of one sound record on the film which is to be used in reproducing I prepare a plurality of parallel records on the one film as is illustrated in Fig. 4. These may be of the kind known in this art as variable area or that known as variable density. The record may be of a continuous dialogue, speech, song or piece of music, interrupted at or near the end of the film to continue in the reverse direction on the film or several selections, dialogues, songs or speeches may be recorded. I find it more convenient to prepare the records in alternate reverse order though I do not limit myself or the scope of my invention to this arrangement. The records may be arranged in any convenient manner to allow of operating the film in either direction of movement.

I have also found it convenient to prepare the negative records on separate films and then print them in in alternate reverse order on the positive film, but I do not limit myself or the scope of my invention to this method. Neither do I limit myself or the scope of my invention to the number of record tracks on a single film, or to the width or length of film I use.

What I claim is,—

1. A sound reproducing device including a movable photographic sound record film, a plurality of sound records on said film, some of which are arranged in reverse order to others, winding reels for said film means for rotating said reels, film moving sprockets, means for rotating said sprockets, means for controlling the operation of said sprocket rotating means including an electric reversing switch and an electric control switch actuated by said film, said film normally between and separating the arm and shoe of said control switch to render said control switch inoperable, apertures in said film disposed to permit the arm of switch to pass through one of said apertures and contact the shoe of said switch thus completing an electric circuit, said reversing switch made operable and controlled by said control switch, a lamp and a lens assembly and means for selectively bringing the lens assembly into operable relation to any one of the sound records on said sound record film.

2. A sound reproducing device including a movable photographic sound record film, a plurality of parallel sound records on said film, means for moving said film including sprockets and a driving motor, means for controlling the operation of said motor including an electric circuit control switch, the said film normally between and separating the arm and shoe of said switch to render said switch inoperable, apertures in said film disposed to permit the arm of said switch to pass through one of said apertures and contact the shoe of said switch thus completing an electric circuit, a reversing switch made operable and controlled by said control switch, and means for reproducing the sounds from said sound records selectively.

3. A sound reproducing device comprising a movable photographic sound record film, a plurality of parallel sound records on said film, means for moving said film including sprockets, means for rotating said sprockets including an electric motor, a reversing switch, and a control switch having a shoe and a movable arm in circuit with a source of energy, said film interposed between said shoe and said arm to normally insulate the one from the other, apertures in said film through which the arm may pass and contact the shoe to complete an electric circuit by means of which said reversing switch is actuated, and a photo-electric means for reproducing the sounds from said photographic sound records selectively.

CLYDE ORANGE GALBRAITH.